Nov. 7, 1967  R. L. WATTERS  3,351,926
APPARATUS AND METHOD FOR DETECTING LEAKS IN EVACUATED SYSTEMS
Filed June 5, 1964  2 Sheets-Sheet 1

Inventor:
Robert L. Watters,
by John F. Ahern
His Attorney.

Nov. 7, 1967     R. L. WATTERS     3,351,926
APPARATUS AND METHOD FOR DETECTING LEAKS IN EVACUATED SYSTEMS
Filed June 5, 1964     2 Sheets-Sheet 2
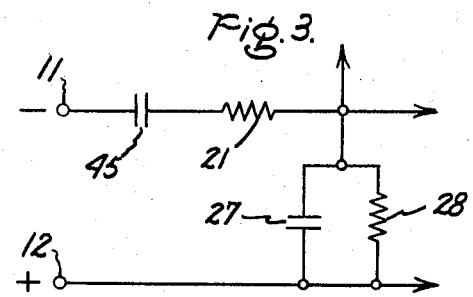
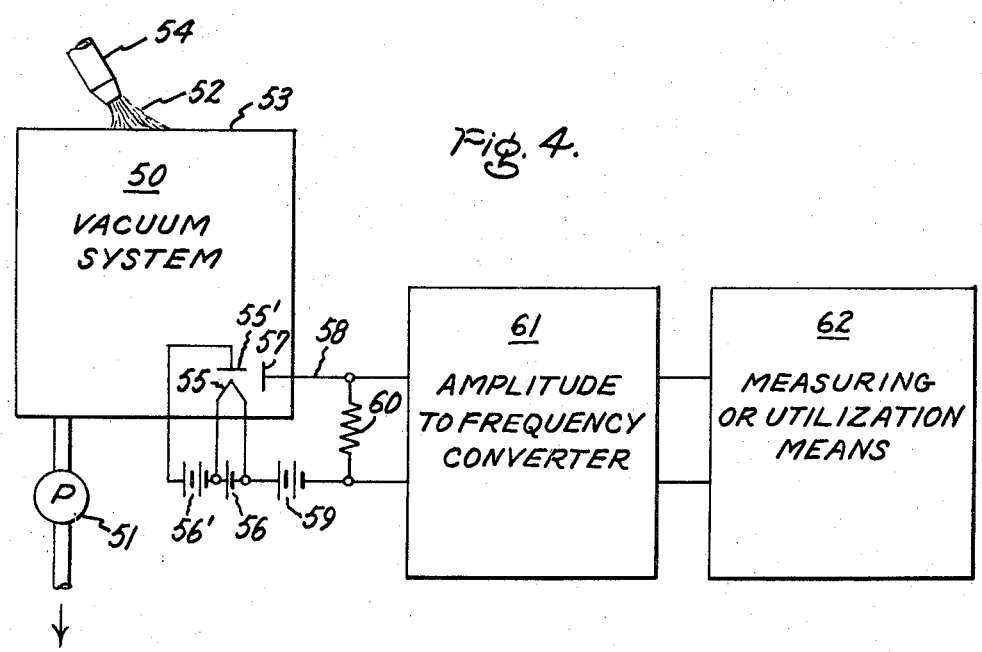
Inventor:
Robert L. Watters,
by John F. Ahern
His Attorney.

United States Patent Office 3,351,926
Patented Nov. 7, 1967

3,351,926
APPARATUS AND METHOD FOR DETECTING
LEAKS IN EVACUATED SYSTEMS
Robert L. Watters, Schenectady, N.Y., assignor to General
Electric Company, a corporation of New York
Filed June 5, 1964, Ser. No. 372,803
11 Claims. (Cl. 340—242)

ABSTRACT OF THE DISCLOSURE

Aural detection of a leak in a vacuum system by directing a probe gas around the system while simultaneously ionizing gas particles within the system. The rate at which ionized gas particles are collected controls the frequency of an audio signal source, so that a change in pitch of the tone so generated indicates seepage of probe gas into the system.

---

The present invention relates generally to discovering and ascertaining the location of flaws that permit ambient gas to leak into low pressure systems, as vacuum devices and the like.

When a large vacuum system is undergoing evacuation, or being "pumped out," the system advantageously is simultaneously tested to discover the presence of any leaks. Early detection is desired because corrective measures oftentimes require returning the system to atmospheric pressure, resulting in total loss of any time previously spent evacuating the system. In the usual cases evacuation time that may be lost ranges from a few days to weeks, depending largely upon the size of the system, pump capacity and ultimate pressure objective.

Detection of leaks can be accomplished by moving a probe which directs tracer gas, as helium or nitrogen, toward localized areas of the external surfaces of the system and simultaneously observing the rate of change of ion current in an ion gauge device that is normally associated with such systems for the purpose of indicating pressure. Generally, the ion current is indicated by a meter reading. Thus, as the system is being evacuated, the meter needle moves slowly from the high end of the scale toward the low end. A sudden departure in the rate of needle movement indicates that the tracer gas is directed toward a leak which is permitting entry of tracer gas into the system.

Two difficulties arise when the aforementioned scheme is used to locate leaks. First, a brief change in the rate of needle movement is likely to escape notice. Consequently, the tracer gas must be directed extremely slowly over the external surface of the system, resulting in a tedious and time consuming procedure. Second, the testing procedure is occasionally the cause of leaks. High vacuum systems are frequently fabricated at least in part from easily breakable material, as glass. When a single operator attempts to move the source of tracer gas over the system while carefully watching the meter needle, a situation conducive to accidental breakage of fragile components of the system is present.

It would be highly desirable to provide a sensitive indicator of variations in the rate of change of ion current so that leak testing of high vacuum systems could be conducted more rapidly and leaks discovered promptly. Ideally, the indicator should provide a response that alerts one conducting the test through means not demanding visual diversion, in order to minimize the risk of accidental breakage.

Accordingly, it is an object of this invention to provide economical means for rapidly detecting leaks in evacuated systems.

Another object of this invention is to provide an improved method for testing vacuum systems for leaks.

Still another object of my invention is to provide an ion current indicator that alerts an operator to variations in the rate of change of the magnitude of ion current and does not require continuous visual observation.

Yet another object of my invention is to provide a more sensitive indicator of variations in the rate of change of magnitude of an electric signal.

Another object of my invention is to provide a more sensitive electric signal sensor for detecting leaks in high vacuum systems and which provides an indication of the presence of a leak in such systems through other than visual means.

Briefly, in accord with one aspect of my invention leaks are detected using a tracer gas and monitoring an ion gauge device. I provide an ion current sensor which features an audible output signal that varies in response to variations in the magnitude of an electric input signal. The sensor features a relaxation oscillator of the type wherein a capacitor is alternatively charged and discharged. The charging rate is varied in response to changes in magnitude of the input signal to provide a corresponding change in oscillator frequency. Stabilizing means independent of the controllable charging means is provided to accelerate initial charging of the capacitor and to decelerate final charging thereof. In this way, the sensor is rendered extremely sensitive to slight variations in the controllable charging rate over a wide range of input signal magnitude.

The features of my invention that I believe to be novel are set forth with particularity in the appended claims. My invention itself, however, both as to its organization and method of operation, together with further objects and advantages thereof, may best be understood by reference to the following description taken in connection with the accompanying drawing in which:

FIGURE 3 illustrates an alternative input network for the circuit of FIGURE 1; and FIGURE 4 is a schematic representation of leak detection in accord with my invention.

Figure 1:
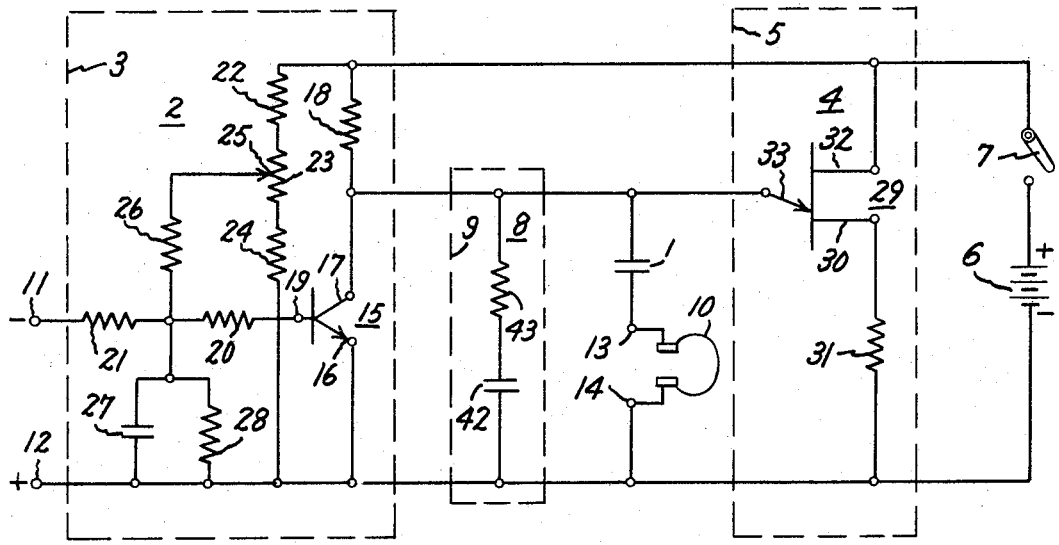
FIGURE 1 is a schematic circuit diagram of an audible current sensor in accord with my invention.

A sensor adapted for use in accord with my invention is illustrated in FIGURE 1. The sensor includes capacitance 1, capacitance charging control means 2 (generally indicated within the confines of dashed line enclosure 3), capacitance discharging means 4 (generally indicated within the confines of dashed line enclosure 5), a suitable source of unidirectional electrical energy 6 connected in series with a switch 7, and stabilizing means 8 connected in effective parallel circuit relationship with capacitance 1 and generally indicated within dashed line enclosure 9. The sensor is adapted to provide an audio frequency output signal to a suitable transducer, as earphones or head set 10, that is connected in series with capacitor 1. The circuit of FIGURE 1 is responsive to the magnitude of an electric signal supplied to input terminals 11 and 12 to provide a corresponding variation in the audio signal detected by head set 10. For leak detection, terminals 11 and 12 are connected to the output of an ion gauge control device.

Head set 10 is advantageously selected to exhibit a low impedance to electric current and, preferably, is of the magnetic type having a resistance magnitude in the order of 10 ohms. Thus, while means to provide an audible output signal corresponding to the frequency with which capacitance 1 is charged and discharged is desired in the sensor of my invention, head set 10 does not significantly affect circuit operation in the preferred embodiment of my invention. For this reason, the negligible resistance exhibited between terminals 13 and 14, to which head set 10 is connected, will be ignored in the interests of clarity and brevity in the ensuing description and the circuit operation will be described as though terminals 13 and 14 were connected by a conductor.

Capacitance charging control means 2 is connected to source 6, when switch 7 is closed, and to capacitance 1. The charging control means is responsive to the magnitude of an input signal supplied to input terminals 11 and 12 to provide a corresponding charging rate for capacitance 1. Thus, as the magnitude of input current becomes greater, in the negative direction, the charging rate of capacitance 1 increases and vice versa.

Capacitance discharging means 4 is connected to capacitance 1 and is responsive to a predetermined charge accumulated by capacitance 1, as reflected by the voltage thereacross, to switch from a high impedance state to a low impedance state in order to provide a low resistance path for capacitance 1 to discharge through until substantially all of the charge accumulated thereon is dissipated. After the charge is dissipated in this way, the discharging means returns again to its high impedance state and capacitance 1 again commences to accumulate charge through capacitance charging control means 2. Thus, the combined effect of the illustrated circuit relationship of capacitance 1, capacitance charging control means 2, capacitance discharging means 4 and source 6 is to provide a relaxation oscillator whenever switch 7 is in the closed position. Switch 7 will be assumed to be closed for purpose of the ensuing description.

In accord with one aspect of the present invention, stabilizing means 8, which is independent of capacitance charging control means 2, is connected in parallel circuit relationship with capacitance 1. Stabilizing means 8 accelerates the initial charging of capacitance 1 and thereafter absorbs energy from charging means 2 to decelerate the final charging of capacitance 1. In this way, sensitivity of the frequency of the oscillator to deviations in the magnitude of input signal is maintained extremely high throughout a wide range of input signal magnitude.

In the detailed specific embodiment of my invention illustrated in FIGURE 1, capacitance charging control means 2 includes an NPN type transistor 15 having its emitter 16 connected to the negative terminal of source 6. Collector 17 of transistor 15 is connected to one terminal of capacitance 1 and also is connected to the positive terminal of source 6 through a resistance 18. The other terminal of capacitance 1 is connected through head set 10 to the negative terminal of source 6.

Base 19 of transistor 15 is connected by serially disposed resistances 20 and 21 to input terminal 11. A voltage divider network, including series connected resistance 22, tapped resistance 23 and resistance 24, is connected in parallel circuit relationship with source 6. Resistances 22 and 24 enable more precise setting of the circuit threshold and they are advantageously omitted when their cost is not justified by this feature. Variable tap 25, of resistance 23, is connected by resistance 26 to the junction of series connected resistances 20 and 21. Finally, a low-pass noise filter is provided by parallel connected capacitance 27 and resistance 28 that are connected from the aforementoned junction of series connected resistances 20 and 21 to the negative terminal of source 6. Input terminal 12 is directly connected to the negative terminal of source 6.

Operation of the charging means thus far described is as follows. After an input signal to be sensed has been applied to terminals 11 and 12, with terminal 12 serving as the positive input terminal and terminal 11 serving as the negative input terminal, tap 25 is adjusted to provide any desired charging rate for capacitance 1. Thus, capacitance 1 is charged through resistance 18 at a rate which depends upon the conductivity of transistor 15. When transistor 15 is more highly conductive, a greater quantity of current is diverted away from capacitance 1 and charging is at a slower rate than when transistor 15 is less conductive.

The conductivity of transistor 15 is in turn dependent upon the magnitude of current in the base-emitter circuit thereof. The latter current is increased to effect a higher conductivity between collector 17 and emitter 16 when the magnitude of input signal decreases (i.e., when input terminal 11 becomes less negative relative to input terminal 12) and vice versa. In this way charging control means 2 provides a charging rate for capacitance 1 that varies directly with changes in the magnitude of the input signal supplied to terminals 11 and 12.

The specific capacitance discharging means illustrated in FIGURE 1 comprises a unijunction transistor (UJT) 29 having base-one 30 thereof connected to a negative terminal of source 6 by a protective resistance 31. Base-two 32 of UJT 29 is connected to the positive terminal of source 6 and the emitter 33 thereof is connected to collector 17 of transistor 15.

Operation of discharging means 4 is as follows. At the beginning of a charging cycle of capacitance 1, UJT 29 exhibits a high internal resistance between emitter 33 and base-one 30 thereof. This high resistance is maintained until the voltage across capacitance 1 reaches a magnitude approximately equal to one half of the voltage provided by source 6. The actual fraction is substantially equal to the intrinsic standoff ratio of the particular UJT used and typically varies from 0.47 to 0.62. When this predetermined voltage is exceeded, UJT 29 switches, or fires, to exhibit a low impedance between emitter 33 and base-one 30. In this way a low impedance discharge path is provided for capacitance 1 and the charge accumulated thereon is substantially all dissipated. Upon the latter occurrence, UJT 29 switches back to its high impedance state and charging of capacitance 1 commences as before.

Figure 2:
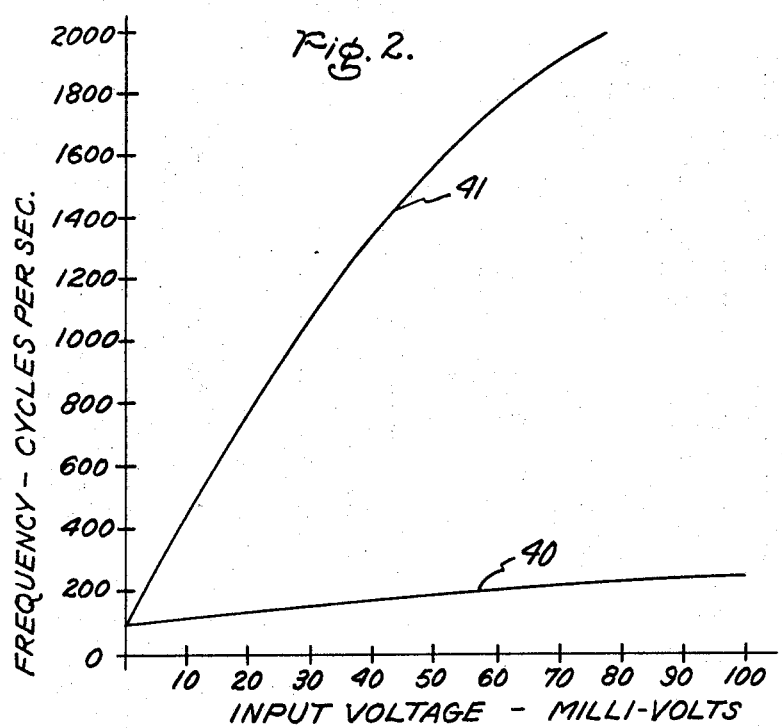
FIGURE 2 is a graph of frequency versus the magnitude of input signal for the sensor of FIGURE 1 and for a similar sensor not in accord with the present invention.

Curve 40 of FIGURE 2 illustrates the sensitivity of output frequency to input voltage for the portion of the circuit n FIGURE 1 thus fair described. Curve 41 of FIGURE 2 illustrates the improved sensitivity achieved by introducing stabilizing means into the circuit of FIGURE 1 as will be described presently.

In accord with the present invention, stabilizing means 8 is provided which is connected in effective parallel circuit relationship with capacitance 1. By "effective parallel circuit relationship" it is intended to include the case wherein a low impedance transducer, as head set 10 illustrated, is connected in series with capacitance 1 and the stabilizing means is actually in parallel circuit relationship with the series circuit so formed. Of course, it is intended to include by the term "effective parallel circuit relationship" the case wherein the stabilizing means is in actual parallel circuit relationship as would be the case when the transducer is disposed elsewhere in the circuit, as in the base-one or base-two circuit of UJT 29, for example, or omitted.

The specific stabilizing means illustrated in FIGURE 1 includes a charge accumulator that can take the form of capacitance 42. Preferably, the charge accumulator exhibits a magnitude of capacitance at least approximately 10 times the capacitance value of capacitance 1. When the magnitude of capacitance exhibited by the accumulator is only two or three times greater than the capacitance value of capacitance 1, sensitivity of the sensor is sacrificed to the point where little advantage is gained over the circuit without the stabilizing means. On the other hand, accumulator capacitance can be increased without limit above the desired range of values without deleteriously affecting sensitivity. In the latter case, the cost and size of the charge accumulator would both be greater than necessary.

Resistance means, as resistance 43, is connected in series circuit relationship with capacitance 42. The resistance value of resistance 43 is selected to be at least approximately ten times the resistance of the discharge path provided for capacitance 1 in order to prevent substantial discharging of capacitor 42. In the ordinary case, the discharge path resistance can be taken as equal to 100 ohms to a good order of approximation, particularly when a base-one resistance, as resistance 31, is used having a resistance value typically about equal to 50 ohms. In a preferred embodiment of my invention, the resistance value of resistance 43 is selected to be equal to approximately 500 times the resistance of the discharge path. The upper limit of the resistance value is essentially set by noise triggering of UJT 29.

Operation of the stabilizing means is as follows. With the aforementioned capacitance and resistance values, capacitance 42 exhibits a substantially constant voltage across its terminals. The magnitude of this voltage is slightly less than the voltage of capacitance 1 just prior to discharging thereof. In a typical case, the voltage across capacitance 42 is about 0.1 volt less than the required firing voltage for UJT 29. The voltage across capacitance 42 is substantially constant because of the much greater magnitude of capacitance which it exhibits, as contrasted to capacitance 1, and because resistor 43 is large enough to prevent substantial discharge of capacitance 42 during the relatively brief portion of the cycle during which UJT 29 is highly conductive.

During the portion of a cycle immediately after capacitance 1 has been discharged, energy is supplied from capacitance 42 to charge capacitance 1 through resistance 43. In this way, the initial charging of capacitance 1 is accelerated by the stabilizing means. The voltage across capacitance 1 rapidly rises to a magnitude slightly less than that required for firing of UJT 29. Thus, the circuit rapidly reaches the most highly sensitive condition wherein a very slight additional charge on capacitance 1 results in discharging thereof through UJT 29 and commencement of another cycle of operation.

When the aforementioned sensitive condition is reached, further charging of capacitance 1 also causes the voltage thereof to exceed the voltage across capacitance 42. During this latter portion of the charging cycle, a portion of the charging current that would ordinarily be available for charging of capacitance 1 is diverted and charges capacitance 42. In this way, the circuit is maintained in the sensitive condition for a much longer period of time than would be the case without stabilizing means. In practice it has been found that the stabilizing means extends the substantially constant voltage portion of the waveform across capacitance 1 by about a factor of 10.

A particularly desirable circuit as shown in FIGURE 1, and for which curve 41 of FIGURE 2 is plotted, contained the following specific components:

| | |
|---|---|
| R–18 | 22KΩ |
| R–20 | 47KΩ |
| R–21 | 47KΩ |
| R–22 | 22KΩ |
| R–23 | 50KΩ |
| R–24 | 22KΩ |
| R–26 | 430KΩ |
| R–31 | 47Ω |
| R–43 | 47KΩ |
| C–1 | mfd .01 |
| C–27 | mfd 10 |
| C–42 | mfd 0.1 |
| Source 6 | volts 16 |
| UJT–29 | 2N1671 |
| Transistor 15 | 2N2349 |

FIGURE 3 is a schematic circuit diagram of an alternative input network for the circuit of FIGURE 1. More specifically, the network of FIGURE 3 features a capacitance 45 connected in series with the input to provide differentiation of the input signal. The advantage of the embodiment is that the derivative of the slowly varying signal, representing ion current, is substantially a constant as the system is being evacuated. The tone heard by the operator is of substantially constant frequency until the rate of change of ion current is materially altered, at which time a sudden departure in frequency is detected. Thus, a sensor as shown in FIGURE 1, but having an input network as illustrated in FIGURE 3, is responsive to changes in the rate of change of an input signal to provide a change in output frequency. The capacitance value of capacitance 45 is advantageously selected to be in the order of 50 mfd., when the circuit includes the aforementioned listed specific components.

FIGURE 4 illustrates, schematically, leak detection in accord with one aspect of the present invention. Gas pressure within an evacuated system 50 is in the process of being reduced by means of a pump 51, for example, that is conveniently selected to be a gas diffusion pump, or the like. A stream 52 of tracer gas, such as helium, is simultaneously directed upon a localized area of the external surface 53 of system 50 by means of nozzle 54. Directional control and sequential scanning of the flow of tracer gas 52 is effected by an operator holding nozzle 54 or, alternatively the nozzle is moved relative to system 50 by any of a number of well-known mechanical means. In this latter case, nozzle 54 is oftentimes conveniently substituted by a tube surrounding system 50 and having a plurality of tracer gas-emitting nozzles directed inwardly toward the external surface of system 50. In such a system gas may be sequentially emitted from the various nozzles in a programed sequence in which the nozzles are opened and closed in accord with a program which may be, for example, fed into a control console by a punched card or tape.

A portion of the gas within system 50 is continuously ionized, as by a thermionic electron emissive cathode or filament 55, for example, connected to a suitable external electric power source 56. An electron accelerator and collector 55′ is advantageously provided and connected to source 56′. Substantially all of the gas ionized, or a relatively constant proportion thereof, is collected at an electrode 57 which is located within system 50 and connected to an external conductor 58. Of course, a gas discharge ionization device is suitable, alternatively.

An electric circuit is established, including conductor 58, in which electric current is present in a magnitude proportional to the rate at which ions are collected at electrode 57. This rate is determined largely by the ionization probability of the gas within system 50. The circuit illustrated includes filament 55, bias source 59, a resistance 60, conductor 58 and electrode 57.

The current in the last-described circuit is converted into an alternating current signal having an audio frequency that varies in accord with changes in the magnitude of the current or, alternatively, in accord with variations in the rate of change of the magnitude depending upon whether a circuit of the type described in connection with FIGURE 1 or FIGURE 3 is employed, respectively. Converter 61 receives as an input the signal across resistance 60 and, preferably after preamplification, supplies a corresponding signal to the input of a circuit as shown in FIGURE 1 (that can be adapted in accord with FIGURE 3 when desired). Preamplification is conveniently achieved by the direct current amplifier ordinarily associated with ion gauges, in which case the output meter terminals provide an advantageous source of voltage to be connected to terminals 11 and 12.

Measuring or utilization means 62 is connected to the output of amplitude-to-frequency converter 61. Such means can include a headset, connected as shown at 10 in FIGURE 1, to output terminals 13 and 14 in the case of low input impedance utilization means. High input impedance utilization means are more advantageously connected to base-one 30 of UJT 29. In many cases, utilization means 62 is conveniently selected to be an alternating current relay capacitively coupled to converter 61 and thereby rendered frequency sensitive to effect activation of an alarm or automatic system protective device when the ion current through resistor 60 either exceeds a predetermined magnitude or undergoes a substantial variation in its rate of change. Alternatively, the combination of a frequency selective filter, rectifier and direct current relay is used as utilization means 62 when great precision is demanded, as is well-known in the art. Of course, many other means for detecting frequency variations in the output signal from converter 61 will suggest themselves to those skilled in the art and may be used to provide an indication, or stimulate further system response, when there is a leak in the vicinity of the localized area upon which tracer gas 52 impinges. For example, when nozzle 54 is mechanically movable, the source of power therefor is advantageously automatically shut off when a leak has been found.

The ion current can either increase or decrease in response to a leak, depending upon whether the tracer gas is more or less readily ionizable, respectively, than the gas normally present within system 50. Thus, nitrogen tracer gas, for example, normally increases the probability of ionization when directed toward a leak because nitrogen is readily ionizable. An increase in ion current occurs. The reverse is normally true when helium, a less readily ionizable gas, is directed toward a leak. In general, any gas having a probability of ionization differing from that of the gas surrounding and within system 50 is a suitable tracer gas.

There has been shown and described herein a particularly advantageous method for ascertaining the presence of leaks in evacuatable systems. The novel audio sensor circuits described provide sensitive detection over a wide range of input signal amplitude and thus accommodate a similarly large range of ion current values. Thus, continual adjustment to maintain sensitivity is not required in the presence of the expected decline in ion current which attends evacuation of the system.

While only certain preferred features of the invention have been shown by way of illustration, many modifications and changes will occur to those skilled in the art. For example, the polarity of input signal to the sensors can readily be reversed, in which case the frequency varies inversely with the magnitude of input signal. The polarity illustrated is selected for more convenient connection to most known ion gauge control devices. It is, therefore, to be understood that the appended claims are intended to cover all such modifications and changes, as the foregoing, that fall within the true spirit and scope of the invention.

What I claim as new and desire to secure by Letters Patent of the United States is:

1. The method of detecting leaks in a vacuum system during evacuation of the system, which method comprises:
    (a) directing a stream of tracer gas upon a localized area of the external surface of said vacuum system;
    (b) ionizing continuously a proportion of the gas within said vacuum system;
    (c) collecting the gas particles so ionized at an electrode within said vacuum system that is connected to an external conduct;
    (d) continuously regulating an electric current to a magnitude proportional to the rate at which ions are collected at said electrode;
    (e) converting said current into an alternating current signal having an audio frequency that varies in accord with variations in the rate of change of the magnitude of said current; and,
    (f) detecting frequency variations in said signal to provide an indication when there is a leak in the vicinity of said localized area.

2. The method of locating leaks in a vacuum system, which method comprises:
    (a) directing a flow of tracer gas upon a localized area of the external surface of said vacuum system;
    (b) ionizing continuously a portion of the gas within said vacuum system;
    (c) collecting substantially all of the gas particles so ionized at an electrode within said vacuum system that is connected to an external conductor;
    (d) continuously regulating an electric current to a magnitude proportional to the rate at which ions are collected at said electrode;
    (e) converting said current into an alternating current signal having an audio frequency that varies in accord with the magnitude of said current; and,
    (f) detecting frequency variations in said signal to provide an indication when there is a leak in the vicinity of said localized area.

3. The method for detecting leaks in an evacuated system, which method comprises:
    (a) directing a tracer gas toward a localized area of the external surface of said system;
    (b) subjecting the gas particles within said evacuated system to collisions with electrons so as to ionize said gas particles;
    (c) collecting the ionized gas particles at electrode means within said system connected to an externally accessible electric conductor;
    (d) continuously regulating an electric current to a magnitude proportional to the rate at which ions are produced within said system;
    (e) converting said current into an alternating current signal having a frequency that varies in accord with variations in the magnitude of said current; and,
    (f) detecting frequency variations in said signal to provide an indication that said tracer gas is directed in the vicinity of a leak whereat tracer gas is admitted into said evacuated system and thereby changes the ionization probability within the system and the rate at which ions are collected at said electrode.

4. The method of locating leaks in a vacuum system during evacuation of the system, which method comprises:
    (a) directing a flow of tracer gas upon a localized area of the external surface of said vacuum system;
    (b) ionizing continuously a portion of the gas within said vacuum system;
    (c) collecting the gas particles so ionized at an electrode within said vacuum system that is connected to an external conductor;
    (d) continuously regulating an electric current to a magnitude proportional to the ionization probability within said system;
    (e) converting said current into an alternating current signal having a frequency that varies in accord with variations in the rate of change of the magnitude of said current; and,
    (f) detecting frequency variations in said signal to provide an indication when there is a leak in the vicinity of said localized area.

5. The method for detecting leaks in a system being evacuated, which method comprises:
    (a) directing a tracer gas toward a localized area of the external surface of said system;
    (b) ionizing a portion of the gas within said evacuated system;
    (c) collecting the gas particles so ionized at electrode means within said system connected to an externally accessible electric conductor;
    (d) continuously regulating an electric current to a magnitude proportional to the rate at which ions are produced within said system;
    (e) converting said current into an alternating current signal having a frequency that varies in accord with variations in the rate of change of magnitude of said current; and, (f) detecting frequency variations in said signal to provide an indication that said tracer gas is directed in the vicinity of a leak whereat tracer gas is admitted into said evacuated system and thereby changes the rate at which ions are collected at said electrode.

6. A converter having an output signal that varies in frequency in response to variations in the magnitude of an electric input signal, said converter comprising:

(a) a capacitance;

(b) capacitance charging means connected to said capacitance and responsive to the magnitude of an electric input signal to provide a corresponding magnitude of charging current for said capacitance;

(c) capacitance discharging means connected to said capacitance and responsive to a predetermined voltage across said capacitance to switch from a high impedance state to a low impedance state to provide a low resistance discharge path for said capacitance so that substantially all of the charge stored in said capacitance is periodically dissipated; and, (d) stabilizer means connected in effective parallel circuit relationship with said capacitance including a charge accumulator exhibiting a magnitude of capacitance at least approximately ten times greater than the capacitance value of said capacitance and resistive means in series circuit with said accumulator exhibiting a magnitude of resistance at least approximately ten times greater than the resistance of said low resistance discharge path.

7. A converter having an output signal that varies in frequency in response to variations in the rate of change in magnitude of an electric input signal, said converter comprising:

(a) a capacitance;

(b) capacitance charging means connected to said capacitance and responsive to the rate of change in magnitude of an electric input signal to provide a corresponding magnitude of charging current for said capacitance;

(c) capacitance discharging means connected to said capacitance and responsive to a predetermined voltage across said capacitance to switch from a high impedance state to a low impedance state to provide a low resistance discharge path for said capacitance so that substantially all of the charge stored in said capacitance is periodically dissipated; and, (d) stabilizer means connected in effective parallel circuit relationship with said capacitance including a charge accumulator exhibiting a magnitude of capacitance at least approximately ten times greater than the capacitance value of said capacitance and resistive means in series circuit with said accumulator exhibiting a magnitude of resistance at least approximately ten times greater than the resistance of said low resistance discharge path.

8. A sensor having an audible output signal that varies in frequency in response to variations in the magnitude of an electric input signal, said sensor comprising:

(a) a capacitor;

(b) capacitor charging means connected to said capacitor and responsive to the magnitude of an electric input signal to provide a corresponding magnitude of charging current for said capacitor;

(c) capacitor discharging means connected to said capacitor and responsive to a predetermined voltage across said capacitor to switch from a high impedance state to a low impedance state to provide a low resistance discharge path for said capacitor so that substantially all of the charge stored in said capacitor is periodically dissipated;

(d) stabilizer means connected in effective parallel circuit relationship with said capacitor including a charge accumulator exhibiting a magnitude of capacitance at least approximately ten times greater than the magnitude of capacitance of said capacitor and resistive means in series circuit with said accumulator exhibiting a magnitude of resistance at least approximately ten times greater than the resistance of said low resistance discharge path; and, (e) an electro-mechanical transducer connected in circuit with said capacitor providing an audible output signal corresponding in frequency to the frequency with which said capacitor is discharged.

9. The method for detecting leaks in an evacuated system, which method comprises:

(a) applying a tracer gas to a localized area of the external surface of said system;

(b) ionizing continuously a portion of the gas within said system;

(c) continuously collecting the ionized gas particles at a rate which establishes a magnitude of current; and (d) generating an audio signal of frequency in accordance with the magnitude of said current whereby a frequency variation is indicative of a leak in the vicinity of said localized area.

10. The method of claim 9 wherein the step of ionizing a portion of the gas within said system comprises subjecting said portion of the gas to electron bombardment.

11. The method of claim 9 wherein the step of ionizing a portion of the gas within said system comprises maintaining a gas discharge within said system.

References Cited

UNITED STATES PATENTS

| | | | |
|---|---|---|---|
| 2,486,199 | 10/1949 | Nier | 73—40.7 |
| 2,507,321 | 5/1950 | Sherwood | 73—40.7 |
| 3,022,498 | 2/1962 | Alcott | 340—253 |
| 3,221,318 | 11/1965 | Quirk | 340—222 |

NEIL C. READ, *Primary Examiner.*

D. MYER, *Assistant Examiner.*